(12) United States Patent
Okamoto et al.

(10) Patent No.: US 12,504,321 B2
(45) Date of Patent: Dec. 23, 2025

(54) OVERHEAD OPTICAL CABLE TEST SYSTEM AND METHOD

(71) Applicant: NTT, Inc., Tokyo (JP)

(72) Inventors: Tatsuya Okamoto, Tokyo (JP); Daisuke Iida, Tokyo (JP); Yusuke Koshikiya, Tokyo (JP); Nazuki Honda, Tokyo (JP)

(73) Assignee: NTT, Inc., Tokyo (JP)

( * ) Notice: Subject to any disclaimer, the term of this patent is extended or adjusted under 35 U.S.C. 154(b) by 273 days.

(21) Appl. No.: 18/286,460

(22) PCT Filed: Apr. 14, 2021

(86) PCT No.: PCT/JP2021/015414
§ 371 (c)(1),
(2) Date: Oct. 11, 2023

(87) PCT Pub. No.: WO2022/219739
PCT Pub. Date: Oct. 20, 2022

(65) Prior Publication Data
US 2024/0192049 A1    Jun. 13, 2024

(51) Int. Cl.
*G01H 9/00*    (2006.01)
(52) U.S. Cl.
CPC .................. *G01H 9/004* (2013.01)
(58) Field of Classification Search
None
See application file for complete search history.

(56) References Cited

U.S. PATENT DOCUMENTS

| 5,517,864 | A | * | 5/1996 | Seppa | G01L 5/103 73/862.391 |
| 2008/0019654 | A1 | * | 1/2008 | Corbeels | G02B 6/483 385/135 |
| 2013/0222811 | A1 | * | 8/2013 | Handerek | G01M 11/3127 356/477 |

FOREIGN PATENT DOCUMENTS

| WO | WO-2019126020 A1 * | 6/2019 | ............. G01B 11/18 |
| WO | WO-2020166330 A1 * | 8/2020 | ............. G01B 11/16 |

OTHER PUBLICATIONS

Inoue et al., "Three-Dimensional Modeling of Wire Structures using MMS Measurement Point Cloud," 2020 IEICE General Conference, Higashi-Hiroshima City, Japan, Mar. 17-20, 2020, 324, 5 pages (with English translation).

(Continued)

*Primary Examiner* — Eric S. McCall
*Assistant Examiner* — Nigel H Plumb
(74) *Attorney, Agent, or Firm* — Fish & Richardson P.C.

(57) ABSTRACT

A cable test system, an analysis apparatus, a cable test method, and a program are capable of recognizing a sag section of an overhead cable without sending a worker to a site. In some implementations, the cable test system includes an optical fiber vibration distribution measurement apparatus that acquires a vibration distribution waveform of an overhead optical fiber cable to be tested. The vibration distribution waveform being represented in a time domain and a distance domain in a longitudinal direction. The analysis apparatus that calculates a propagation speed of vibrations propagating through the overhead optical fiber cable from the vibration distribution waveform and detects, as a cable sag section, a section of the overhead optical fiber cable in which the propagation speed is equal to or lower than a threshold value.

10 Claims, 6 Drawing Sheets

(56) References Cited

OTHER PUBLICATIONS

CSE.PSU.edu [online] "Lecture 5: Gradients and Edge Detection," available on or before Sep. 6, 2015, via Internet Archive: Wayback Machine URL<https://web.archive.org/web/20150906081352if_/http://www.cse.psu.edu:80/~rtc12/CSE486/lecture05.pdf>, retrieved on Sep. 2025, retrieved from URL<http://www.cse.psu.edu:80/~rtc12/CSE486/lecture05.pdf>, 42 pages.

\* cited by examiner

VIBRATION DISTRIBUTION WAVEFORM

TWO-DIMENSIONAL SPECTRUM OF VIBRATIONS

OVERHEAD OPTICAL CABLE TEST SYSTEM AND METHOD

CROSS-REFERENCE TO RELATED APPLICATIONS

This application is a National Stage application under 35 U.S.C. § 371 of International Application No. PCT/JP2021/015414, having an International Filing Date of Apr. 14, 2021. The disclosure of the prior application is considered part of the disclosure of this application, and is incorporated by reference in its entirety into this application.

TECHNICAL FIELD

The present disclosure relates to a cable test system, an analysis apparatus, a cable test method, and a program for detecting a sag of an optical fiber cable using a distributed acoustic sensor (DAS) that acquires a vibration distribution of an optical fiber from incident test light.

BACKGROUND ART

Since there is a risk of communication interruption due to vehicle contact with a sagged overhead cable or the like, as a part of communication equipment maintenance, visual inspection for the presence or absence of a sag in an overhead cable is performed (for example, refer to Non Patent Literature 1).

CITATION LIST

Non Patent Literature

Non Patent Literature 1: Masaaki INOUE, Hitoshi ARAKAKI, Tomoya SHIMIZU, Hiroyuki OSHIDA, "Study on three-dimensional modeling of linear structure using MMS measurement point group", The Institute of Electronics, Information and Communication Engineers, 2020 General Conference, B-13-24, 2020.

SUMMARY OF INVENTION

Technical Problem

The visual inspection requires human operation because a worker is sent to a site, and there is a problem in terms of man-hours and costs. In order to solve the above problem, an object of the present invention is to provide a cable test system, an analysis apparatus, a cable test method, and a program that are capable of recognizing a sag section of an overhead cable without sending a worker to a site.

Solution to Problem

In order to achieve the above object, a cable test system according to the present invention calculates a propagation speed of vibrations, propagating through an overhead optical fiber cable in a longitudinal direction, from a vibration distribution of the overhead optical fiber cable measured by using an optical fiber vibration distribution measurement apparatus, and identifies, with a cable sag section of the overhead optical fiber cable, a section in which the calculated propagation speed of vibrations is equal to or lower than a predetermined value.

Specifically, according to the present invention, there is provided a cable test system including:
  an optical fiber vibration distribution measurement apparatus that acquires a vibration distribution waveform of an overhead optical fiber cable to be tested, the vibration distribution waveform being represented in a time domain and a distance domain in a longitudinal direction; and
  an analysis apparatus that calculates a propagation speed of vibrations propagating through the overhead optical fiber cable from the vibration distribution waveform and detects, as a cable sag section, a section of the overhead optical fiber cable in which the propagation speed is equal to or lower than a threshold value.

Further, according to the present invention, there is provided an analysis apparatus configured to: receive a vibration distribution waveform which is acquired from an overhead optical fiber cable to be tested and is represented in a time domain and a distance domain in a longitudinal direction; calculate a propagation speed of vibrations propagating through the overhead optical fiber cable from the vibration distribution waveform; and detect, as a cable sag section, a section of the overhead optical fiber cable in which the propagation speed is equal to or lower than a threshold value.

Further, according to the present invention, there is provided a cable test method including:
  acquiring a vibration distribution waveform of an overhead optical fiber cable to be tested, the vibration distribution waveform being represented in a time domain and a distance domain in a longitudinal direction;
  calculating a propagation speed of vibrations propagating through the overhead optical fiber cable from the vibration distribution waveform; and
  detecting, as a cable sag section, a section of the overhead optical fiber cable in which the propagation speed is equal to or lower than a threshold value.

The cable test system can specify a sag section of an overhead optical fiber cable by an optical test from an optical fiber vibration distribution measurement apparatus provided in a communication building. Therefore, according to the present invention, it is possible to provide a cable test system, an analysis apparatus, and a cable test method capable of recognizing a sag section of an overhead cable without sending a worker to a site.

Here, the analysis apparatus can detect peak portions or valley portions of vibration values appearing in the vibration distribution waveform in a certain section, and set, as a propagation speed of the vibrations in the certain section, a gradient of an approximate straight line tracing the peak portions or the valley portions from one end to the other end of the certain section.

Further, the analysis apparatus may acquire a plurality of vibration modes represented in a wave number domain and a frequency domain by performing two-dimensional Fourier transform on the vibration distribution waveform in a certain section, and set, as a propagation speed of the vibrations in the certain section, a gradient of an approximate straight line obtained from each of the vibration modes.

Further, according to the present invention, there is provided a program for causing a computer to function as the analysis apparatus. The analysis apparatus according to the present invention can also be implemented by a computer and a program, and the program can be provided by being recorded in a recording medium or provided via a network.

Note that the inventions described above can be combined in any possible manner.

Advantageous Effects of Invention

According to the present invention, it is possible to provide a cable test system, an analysis apparatus, a cable test method, and a program that are capable of recognizing a sag section of an overhead cable without sending a worker to a site.

DESCRIPTION OF EMBODIMENTS

Figure 1:
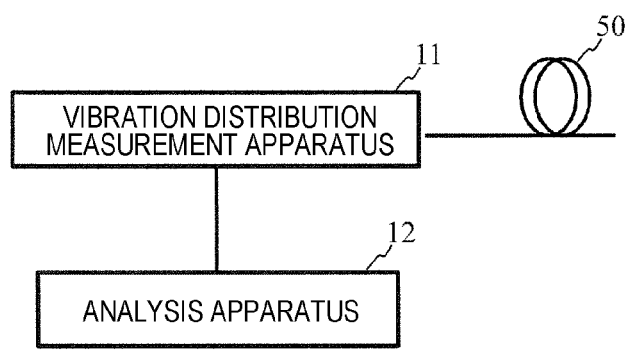
FIG. 1 is a diagram illustrating a cable test system according to the present invention.

Embodiments of the present invention will be described with reference to the accompanying drawings. The embodiments to be described below are examples of the present invention, and the present invention is not limited to the embodiments to be described below. Note that components having the same reference numerals in the present specification and the drawings denote the same components.

Embodiment 1

FIG. 1 is a diagram illustrating a cable test system according to the present embodiment. The cable test system includes an optical fiber vibration distribution measurement apparatus 11 that acquires a vibration distribution waveform of an overhead optical fiber cable 50 to be tested, the vibration distribution waveform being represented in a time domain and a distance domain in a longitudinal direction, and an analysis apparatus 12 that calculates a propagation speed of vibrations propagating through the overhead optical fiber cable 50 from the vibration distribution waveform and detects, as a cable sag section, a section of the overhead optical fiber cable 50 in which the propagation speed is equal to or lower than a threshold value.

The optical fiber vibration distribution measurement apparatus 11 is a distributed acoustic sensor (DAS) using a coherent OTDR (C-OTDR) technique. The DAS may be any method of detecting a phase change of Rayleigh scattered light due to vibrations of an optical fiber to be tested. Note that, even though vibrations may be applied to the overhead optical fiber cable 50 in a test, since the overhead optical fiber cable 50 constantly vibrates due to wind, these vibrations may be measured.

The analysis apparatus 12 receives the vibration distribution waveform which is acquired from the overhead optical fiber cable 50 and is represented in a time domain and a distance domain in a longitudinal direction, calculates a propagation speed of vibrations propagating through the overhead optical fiber cable 50 from the vibration distribution waveform, and detects, as a cable sag section, a section of the overhead optical fiber cable 50 in which the propagation speed is equal to or lower than a threshold value.

The analysis apparatus calculates a propagation speed of vibrations by using the following two methods.

(Method 1)

Figure 2:
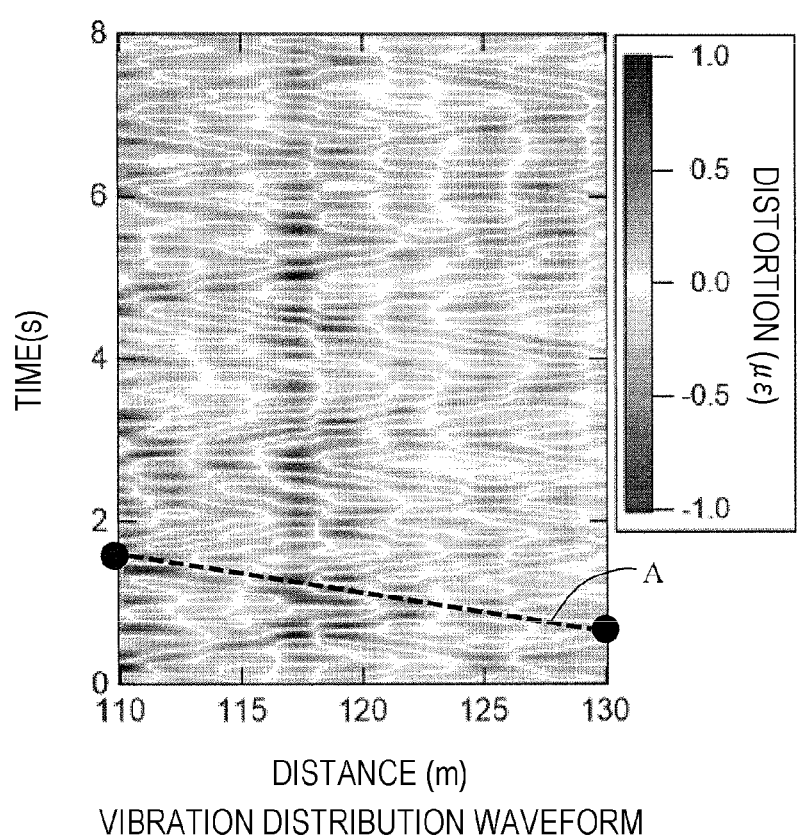
FIG. 2 is a diagram for explaining a method of analyzing a propagation speed of vibrations in an analysis apparatus according to the present invention.

FIG. 2 is a diagram illustrating a vibration distribution waveform for explaining the present method. The vibration distribution waveform indicates a distribution obtained by representing vibrations of the overhead optical fiber cable 50 in a certain section by a two-dimensional waveform expressed by a distance and a time, the vibrations being acquired by optical fiber vibration distribution measurement (DAS). In FIG. 2, the certain section is a section that represents a distance, from the vibration distribution measurement apparatus 11, ranging from 110 m (one end) to 130 m (the other end) in a longitudinal direction of the overhead optical fiber cable 50.

Method 1 is a method of detecting peak portions or valley portions of vibration values appearing in the vibration distribution waveform in the certain section and setting, as a propagation speed of the vibrations in the certain section, a gradient of an approximate straight line tracing the peak portions or the valley portions from one end to the other end of the certain section.

The analysis apparatus 12 calculates a propagation speed of vibrations propagating in the longitudinal direction of the optical fiber cable by analyzing the vibration distribution of the overhead optical fiber cable 50 that is acquired by the optical fiber vibration distribution measurement (DAS). Specifically, the analysis apparatus 12 draws a straight line tracing portions with large vibrations (peak portions) or portions with small vibrations (valley portions) in a two-dimensional distance-time waveform of FIG. 2. In the vibration distribution of FIG. 2, "peak portions" and "valley portions" are represented by dark colors. In addition, "drawing a straight line tracing" peak portions or valley portions means finding a plurality of peak (valley) portions lined up in a substantially straight line and drawing a straight line, from one end to the other end, coming in contact with the portions. For example, a center point of a peak (valley) portion may be detected, and a straight line may be detected by a least-squares method.

After drawing a straight line in the vibration distribution of FIG. 2, the analysis apparatus 12 detects a gradient of the straight line and sets the gradient as a propagation speed of vibrations in the section. In FIG. 2, the straight line A is a drawn straight line tracing the peak portions, and the propagation speed of the vibrations is obtained from the gradient in accordance with the following expression.

$$\text{Distance of 20 m} \div \text{Time of 1.06 s} = \text{Propagation Speed of 18.9 m/s}$$

(Method 2)

Figure 3:
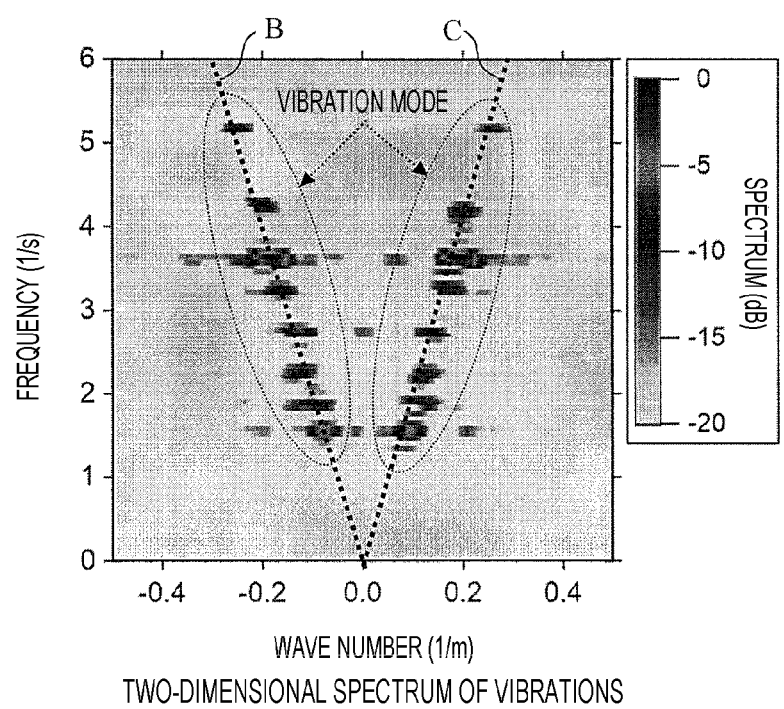
FIG. 3 is a diagram for explaining a method of analyzing a propagation speed of vibrations in an analysis apparatus according to the present invention.

FIG. 3 is a diagram illustrating a two-dimensional spectrum for explaining the present method. The analysis apparatus 12 acquires a two-dimensional spectrum distribution in a wave number (k) domain and a frequency ($\omega$) domain as illustrated in FIG. 3 by performing two-dimensional Fourier transform on the vibration distribution waveform as illustrated in FIG. 2. A dark color portion of the two-dimensional spectrum represents a vibration mode.

Method 2 is a method of acquiring a plurality of vibration modes represented in a wave number domain and a frequency domain by performing two-dimensional Fourier transform on the vibration distribution waveform in a certain section, and setting, as a propagation speed of the vibrations in the certain section, a gradient of an approximate straight line obtained from each of the vibration modes.

The analysis apparatus 12 calculates a propagation speed of the vibrations propagating in the longitudinal direction of the optical fiber cable by analyzing the vibration mode represented by the two-dimensional spectrum of FIG. 3. Specifically, the analysis apparatus 12 obtains two approximate straight lines (straight line B and straight line C) from the plurality of vibration modes appearing in the two-dimensional spectrum of FIG. 3 that is represented in a wave number domain and a frequency domain. For example, the analysis apparatus 12 may detect a center point of the vibration mode (dark color portion) and detect an approximate straight line by a least-squares method. The straight line B represents a regressive wave (k<0) in the longitudinal direction of the optical fiber cable, and the straight line C represents a progressive wave (k>0) in the longitudinal direction of the optical fiber cable.

Since the propagation speed of the vibrations is given by v=ω/k, the gradient of the approximate straight line (B, C) represents the propagation speed. In FIG. 3, the propagation speed of the vibrations is obtained from the gradient of the approximate straight line (B, C) in accordance with the following expression.

Frequency of 3.625 s$^{-1}$/Wave Number of 0.191 m$^{-1}$=Propagation Speed of 18.9 m/s The cable test system calculates a propagation speed of vibrations for each section of the overhead optical fiber cable 50, and detects a section in which a sag occurs on the cable.

The propagation speed of vibrations is proportional to the square root of a cable tension force, as in the following Equation.

[Equation 1]

$$\frac{\partial^2 y}{\partial t^2} = v^2 \frac{\partial^2 y}{\partial x^2}, \quad (1)$$

$$v = \sqrt{\frac{T}{\rho}}$$

Here,
  y indicates a cable displacement, t indicates a time, x indicates a coordinate in a longitudinal direction of a cable, v indicates a propagation speed, T indicates a cable tension force, and ρ indicates a cable density.

The cable tension force T is low in a cable sag section. For this reason, the analysis apparatus 12 can specify, as a cable sag section, a section in which the propagation speed v of vibrations is low as represented by Equation (1).

Figure 4:
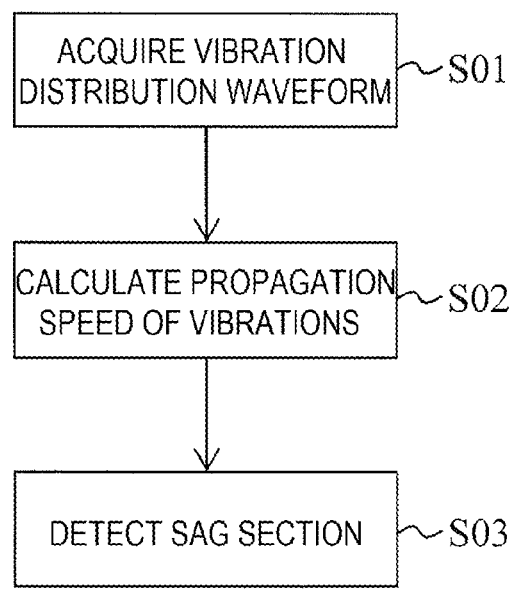
FIG. 4 is a flowchart illustrating a cable test method according to the present invention.

FIG. 4 is a flowchart illustrating a cable test method performed by the cable test system.

The test method includes:
  acquiring (step S01) a vibration distribution waveform (for example, refer to FIG. 2) of an overhead optical fiber cable 50 to be tested, the vibration distribution waveform being represented in a time domain and a distance domain in a longitudinal direction;
  calculating (step S02) a propagation speed of vibrations propagating through the overhead optical fiber cable 50 from the vibration distribution waveform (for example, refer to Method 1 and Method 2 described above); and
  detecting (step S03), as a cable sag section, a section of the overhead optical fiber cable 50 in which the propagation speed is equal to or lower than a threshold value.

Example

Figure 5:
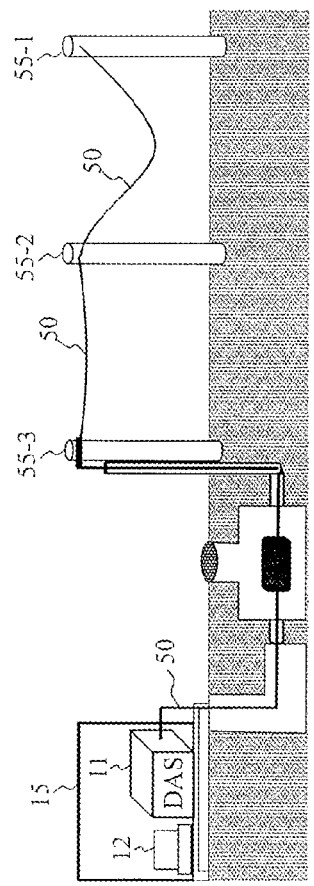
FIG. 5 is a diagram illustrating a cable test system according to the present invention.
Figure 5:
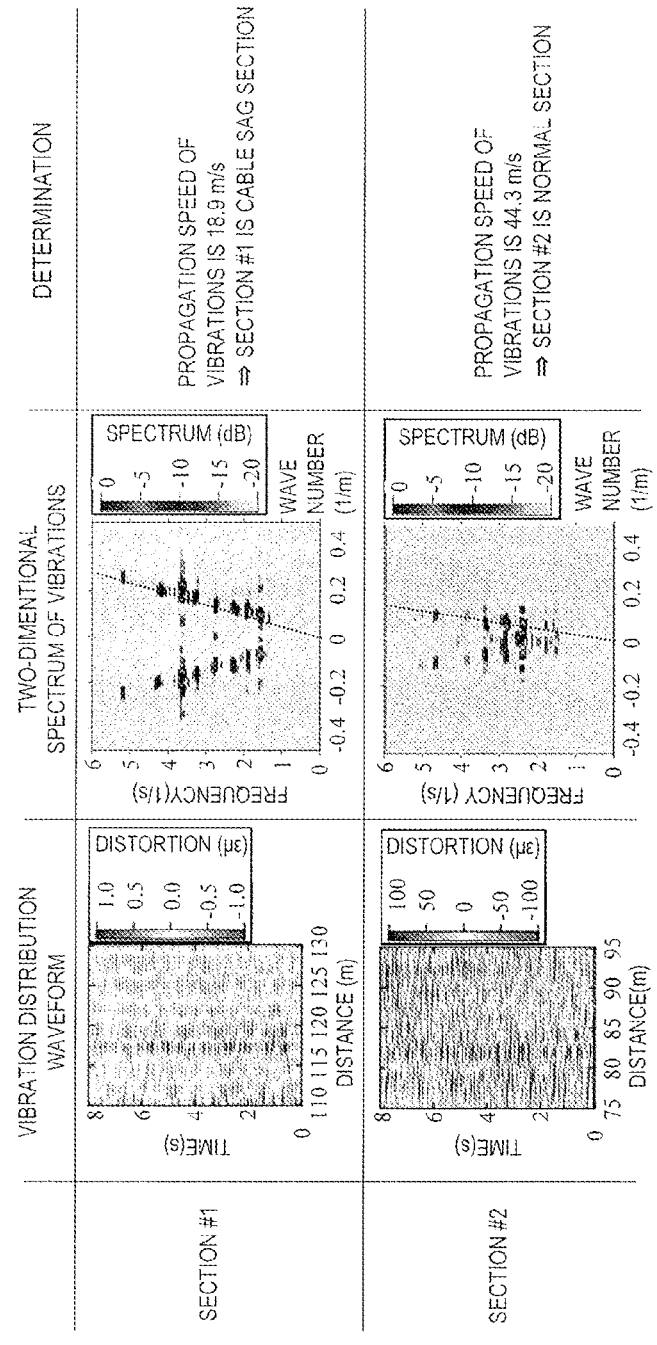

FIG. 5 is a diagram illustrating an example in which the overhead optical fiber cable 50 is tested by the cable test system. For convenience of explanation, it is assumed that the overhead optical fiber cable 50 has two sections. A section #1 is a section between an electric pole 55-1 and an electric pole 55-2, and a section #2 is a section between the electric pole 55-2 and an electric pole 55-3.

The vibration distribution waveforms in the section #1 and the section #2 are obtained by an optical test from the vibration distribution measurement apparatus 11 of the cable test system provided in a communication building 15.

The analysis apparatus 12 calculates a propagation speed of vibrations in each section of the overhead optical fiber cable 50 from the vibration distribution waveform by Method 1. Alternatively, the analysis apparatus 12 calculates a propagation speed of vibrations in each section of the overhead optical fiber cable 50 from a two-dimensional spectrum obtained by performing two-dimensional Fourier transform on the vibration distribution waveform by Method 2.

The analysis apparatus 12 compares the propagation speed of vibrations in each section with a threshold value (for example, a speed of 30 m/s), and determines that the section #2, in which the propagation speed is higher than the threshold value, is a "normal section" and the section #2, in which the propagation speed is lower than the threshold value, is a "cable sag occurrence".

The cable test system can specify a cable sag section by an optical test from the communication building 15. Therefore, it is possible to reduce human operation.

Embodiment 2

The analysis apparatus 12 can also be implemented by a computer and a program, and the program can be provided by being recorded in a recording medium or via a network.

Figure 6:
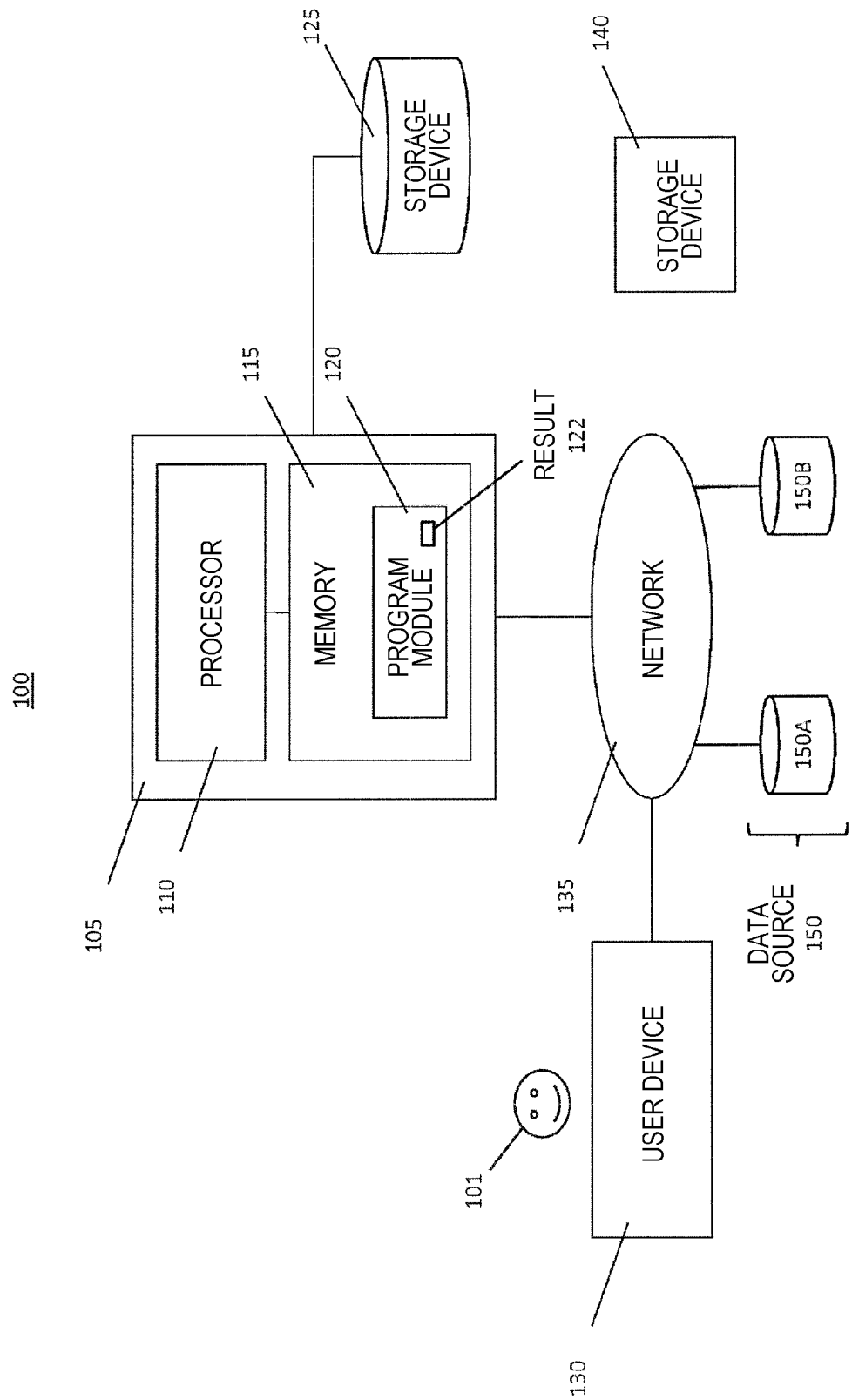
FIG. 6 is a diagram illustrating a cable test system according to the present invention.

FIG. 6 illustrates a block diagram of a system 100. The system 100 includes a computer 105 connected to a network 135.

The network 135 is a data communication network. The network 135 may be a private network or a public network, and may include any or all of (a) a personal area network, for example, covering a room, (b) a local area network, for example, covering a building, (c) a campus area network, for example, covering a campus, (d) a metropolitan area network, for example, covering a city, (e) a wide area network, for example, covering an area connected across boundaries of cities, rural areas, or countries, and (f) the Internet. Communication is performed by an electronic signal and an optical signal via the network 135.

The computer 105 includes a processor 110 and a memory 115 connected to the processor 110. In the present specification, although the computer 105 is presented as a stand-alone device, the computer 105 is not limited thereto, and may be rather connected to other devices (not illustrated) in a distributed processing system.

The processor 110 is an electronic device including logic circuitry that responds to and executes instructions.

The memory 115 is a tangible computer-readable storage medium in which a computer program is encoded. In this regard, the memory 115 stores data and instructions, that is, program codes, that are readable and executable by the processor 110, in order to control an operation of the processor 110. The memory 115 can be implemented by a random access memory (RAM), a hard drive, a read-only memory (ROM), or a combination thereof. One of the components of the memory 115 is a program module 120.

The program module 120 includes instructions for controlling the processor 110 to perform processes described in the present specification. Although the present specification describes that operations are executed by the computer 105, a method, a process, or a sub-process thereof, the operations are actually executed by the processor 110.

In the present specification, the term "module" is used to refer to a functional operation that may be embodied either as a stand-alone component or as an integrated configuration of a plurality of sub-components. Therefore, the program module 120 can be implemented as a single module or as a plurality of modules that operate in cooperation with each other. Further, in the present specification, although the program module 120 is described as being installed in the memory 115 and thus implemented in software, the program module 120 can be implemented in any of hardware (for example, an electronic circuit), firmware, software, or a combination thereof.

Although the program module 120 is illustrated as already being loaded into the memory 115, the program module 120 may be configured to be provided on a storage device 140 so as to be subsequently loaded into the memory 115. The storage device 140 is a tangible computer-readable storage medium that stores the program module 120. Examples of the storage device 140 include a compact disk, a magnetic tape, a read-only memory, an optical storage medium, a hard drive or a memory unit including a plurality of parallel hard drives, and a universal serial bus (USB) flash drive. Alternatively, the storage device 140 may be a random access memory or may be another type of electronic storage device provided in a remote storage system (not illustrated) and connected to the computer 105 via the network 135.

The system 100 further includes a data source 150A and a data source 150B which are collectively referred to herein as a data source 150 and are communicatively connected to the network 135. In practice, the data source 150 may include any number of data sources, that is, one or more data sources. The data source 150 may include unstructured data and may include social media.

The system 100 further includes a user device 130 operated by a user 101 and connected to the computer 105 via the network 135. Examples of the user device 130 include an input device, such as a keyboard or a voice recognition subsystem, for enabling the user 101 to input information and command selections to the processor 110. The user device 130 further includes an output device such as a display device, a printer, or a speech synthesizer. A cursor control unit such as a mouse, a trackball, or a touch-sensitive screen allows the user 101 to manipulate a cursor on the display device to input further information and command selections to the processor 110.

The processor 110 outputs a result 122 of execution of the program module 120 to the user device 130. Alternatively, the processor 110 can provide the output to a storage device 125, such as a database or a memory, or to a remote device (not illustrated) via the network 135.

For example, a program that performs processing illustrated in the flowchart of FIG. 4 may be used as the program module 120. The system 100 can be operated as the analysis apparatus 12.

The term "comprise/include . . . " or "comprising/including . . . " specifies that the mentioned features, integers, steps, or components are present, but should be understood that the term does not exclude the presence of one or more other features, integers, steps, or components, or groups thereof. The terms "a" and "an" are indefinite articles for an object and therefore do not exclude embodiments including a plurality of objects.

Other Embodiments

Note that the present invention is not limited to the above embodiments, and various modifications can be made without departing from the gist of the present invention. In short, the present invention is not limited to the specific embodiments, and in the implementation stage, the components may be modified and embodied without departing from the scope of the present invention.

In addition, various inventions can be made by appropriately combining a plurality of components disclosed in the above embodiments. For example, some components may be deleted from all the components illustrated in the embodiments. Further, components in different embodiments may be appropriately combined.

REFERENCE SIGNS LIST

11 Vibration distribution measurement apparatus
12 Analysis apparatus
15 Communication building
50 Overhead optical fiber cable
55 Electric pole
100 System
101 User
105 Computer
110 Processor
115 Memory
120 Program module
122 Result
125 Storage device
130 User device
135 Network
140 Storage device
150 Data source

The invention claimed is:

1. A cable test system comprising:
an optical fiber vibration distribution measurement apparatus that is configured to acquire a vibration distribution waveform of an overhead optical fiber cable to be tested, the vibration distribution waveform being represented in a time domain and a distance domain in a longitudinal direction; and
an analysis apparatus, including one or more processors, that is configured to:
calculate a propagation speed of vibrations propagating through the overhead optical fiber cable from the vibration distribution waveform; and
detect, as a cable sag section, a section of the overhead optical fiber cable in which the propagation speed is equal to or lower than a threshold value.

2. The cable test system according to claim 1,
wherein the analysis apparatus is configured to:
- detect peak portions or valley portions of vibration values appearing in the vibration distribution waveform in a certain section; and
- set, as a propagation speed of the vibrations in the certain section, a gradient of an approximate straight line tracing the peak portions or the valley portions from one end to the other end of the certain section.

3. The cable test system according to claim 1,
wherein the analysis apparatus is configured to:
- acquire a plurality of vibration modes represented in a wave number domain and a frequency domain by performing two-dimensional Fourier transform on the vibration distribution waveform in a certain section; and
- set, as a propagation speed of the vibrations in the certain section, a gradient of an approximate straight line obtained from each of the vibration modes.

4. An analysis apparatus including one or more processors configured to:
- receive a vibration distribution waveform which is acquired from an overhead optical fiber cable to be tested and is represented in a time domain and a distance domain in a longitudinal direction;
- calculate a propagation speed of vibrations propagating through the overhead optical fiber cable from the vibration distribution waveform; and
- detect, as a cable sag section, a section of the overhead optical fiber cable in which the propagation speed is equal to or lower than a threshold value.

5. A non-transitory computer-readable storage medium storing a program for causing a computer to function as the analysis apparatus according to claim 4.

6. The analysis apparatus of claim 4, further configured to:
- detect peak portions or valley portions of vibration values appearing in the vibration distribution waveform in a certain section; and
- set, as a propagation speed of the vibrations in the certain section, a gradient of an approximate straight line tracing the peak portions or the valley portions from one end to the other end of the certain section.

7. The analysis apparatus of claim 4, further configured to:
- acquire a plurality of vibration modes represented in a wave number domain and a frequency domain by performing two-dimensional Fourier transform on the vibration distribution waveform in a certain section; and
- set, as a propagation speed of the vibrations in the certain section, a gradient of an approximate straight line obtained from each of the vibration modes.

8. A cable test method comprising:
- acquiring a vibration distribution waveform of an overhead optical fiber cable to be tested, the vibration distribution waveform being represented in a time domain and a distance domain in a longitudinal direction;
- calculating a propagation speed of vibrations propagating through the overhead optical fiber cable from the vibration distribution waveform; and
- detecting, as a cable sag section, a section of the overhead optical fiber cable in which the propagation speed is equal to or lower than a threshold value.

9. The cable test method of claim 8, comprising:
- detecting peak portions or valley portions of vibration values appearing in the vibration distribution waveform in a certain section; and
- setting, as a propagation speed of the vibrations in the certain section, a gradient of an approximate straight line tracing the peak portions or the valley portions from one end to the other end of the certain section.

10. The cable test method of claim 8, comprising:
- acquiring a plurality of vibration modes represented in a wave number domain and a frequency domain by performing two-dimensional Fourier transform on the vibration distribution waveform in a certain section; and
- setting, as a propagation speed of the vibrations in the certain section, a gradient of an approximate straight line obtained from each of the vibration modes.

* * * * *